W. P. EVANS.
SHAFT BEARING.
APPLICATION FILED DEC. 3, 1912.
1,132,002.
Patented Mar. 16, 1915.
FIG. 3.
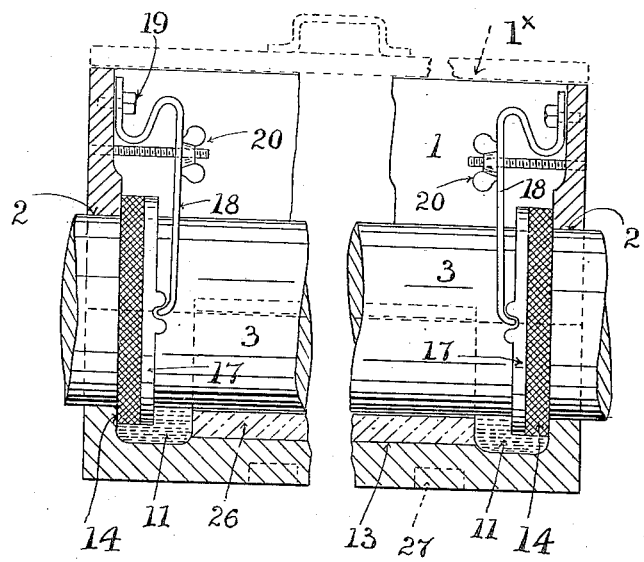
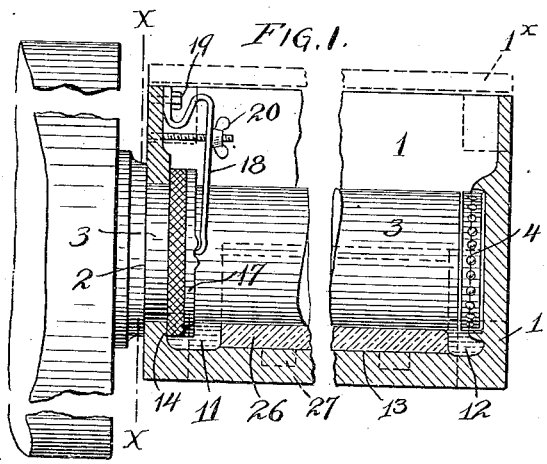
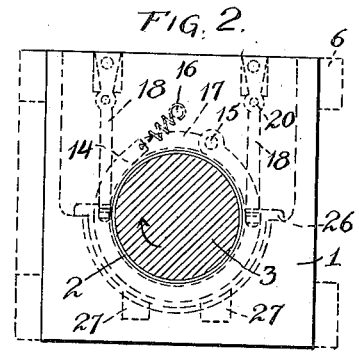
WITNESSES.
Richard Webster Ibberson
Norman Kiernan
INVENTOR.
William Passavage Evans

UNITED STATES PATENT OFFICE.

WILLIAM PARSONAGE EVANS, OF MANCHESTER, ENGLAND, ASSIGNOR TO DAVID LIVINGSTONE SCHULTZ, OF MANCHESTER, ENGLAND.

SHAFT-BEARING.

1,132,002.  Specification of Letters Patent.  Patented Mar. 16, 1915.

Application filed December 3, 1912. Serial No. 734,696.

*To all whom it may concern:*

Be it known that I, WILLIAM PARSONAGE EVANS, a subject of the King of Great Britain and Ireland, residing at "Weston," Park Lane, Irlams-o'-the-Height, Manchester, in the county of Lancaster, England, have invented new and useful Improvements in Shaft-Bearings, of which the following is a specification.

This invention has reference to attachable or built-up bearings or shaft supports with which are combined devices to insure easy running and proper lubrication of said shafts.

The improvements are specially devised for use with respect to shafts of considerable diameter such as the shafts of heavy calender bowls, mangle rollers, the shafts of rolling and grinding mills, &c., but refined or modified appliances according to my invention may prove serviceable with respect to shafts of comparatively small diameter and the same may be made in the form of pedestals or shaft bearings or hangers.

With respect to heavy calenders, &c., the bowl shafts occupy a vertical gap in the end standards, and no particular steps are taken to insure proper lubrication. The shaft of the lowest bowl rests on a block or footstep, but the shafts of the bowls above, rest against vertical facings on the inner cheeks of the end standards. As the bowls wear, the shafts simply settle down in the vertical gaps and accommodate themselves to the facings. It follows, that, in the absence of any system of lubrication, considerable wear occurs and considerable power is wasted in driving. Moreover no provision is made to take-up end thrust on the shafts.

Now according to my invention I propose to utilize and fit withdrawable boxes or lubricant containers and bearings capable of being pushed onto the ends of such shafts, and of being there secured so as to inclose or partly inclose the end of the shaft and occupy a part of the vertical gap. Such withdrawable boxes or lubricant containers may be placed on the shaft before the bowl is lowered into place, and, in that case, the inner flanges may resist end displacement, but, they may be introduced on the shaft end while the shaft is in position and caused to occupy and fit the said vertical gaps as to width.

The attached drawing illustrates various forms of calender and like shaft bearing or pedestal embodying the various features of my invention and the following detailed description will be fully understood having regard to the examples shown therein.

In the said drawings, Figure 1 shows a section of a shaft bearing, suitable for the lowest bowl in a calender, mangle, or such like. Fig. 2 is an end view of the box or bearing on the line X—X, Fig. 1. Fig. 3 shows an example of a bearing or pedestal where the shaft passes through each end of the box.

In the example shown by Figs. 1 and 2 a box or bearing suitable for the lower-most shaft of a calender is illustrated. I provide a removable (or it might be a withdrawable) box 1 and this is either cast or built-up and is open at the top and has a flat base to bed on the supporting plate between the calender cheeks. This box is bored at 2 on the inside or front vertical wall to allow of the shaft 3 being pushed into place end on. The rear end of the casting 1 forming the withdrawable box may be cored out or shaped to receive a ball or roller bearing such as 4 for the bowl shaft 3 to abut against. Means for holding and adjusting such ball or other bearing may be provided. The cast or built-up withdrawable box 1 is made of a size to nicely drop or slide within the space provided for its reception in the frame of the machine in whose construction it is to be embodied.

The withdrawable box 1 is made with a front compartment 11, and in some cases with a back compartment 12, each preferably of narrow width and with a central area 13 to constitute or to receive the brass or other bearing block proper, and, if need be, division walls may be cast in the box. In the narrow compartment 11 nearest to the bowl end I introduce a piece of packing as for example a ring of packing such as 14 having one end anchored at 15 and the other end held by a spring from the pin 16. Thus the packing 14 clings closely to the shaft and acts as an encircling wiper. Around the shaft I place a ring or washer like device 17 and this is acted on by a spring or springs 18 fixed at 19 and regulated by adjusting means 20 to cause the packing to press against the wall where the shaft passes out and with the object of preventing any escape of lubricant. Any other form of simple spring device may be used to press the packing against the wall of the box.

If desired a mere groove may be used to guide the packing. Also a packing may be fixed toward the rear end of the shaft 3. I preferably introduce brasses or bearing blocks into the removable boxes 1. For example in the lowermost box 1 shown by Figs. 1 and 2 I may use a brass block 26 suitably secured to prevent movement as for example by feet 27.

It is to be understood that the boxes surrounding the shafts are adapted to receive grease or lubricant and also that wool fiber or other wads may be introduced. A suitable lid or cover for the boxes 1 may be provided such as the lid or cover $1^x$. In the case of a hollow calender or other shaft made so as to permit of heating, etc., and where such shaft would pass right through the lubricating box or bearing I might fit a second packing 14 with ring and pressure spring 18 to prevent escape of lubricant at the outer end of said box or bearing.

I wish it to be understood that I may build-up the boxes 1 in sections suitably connected together and designed to accommodate the several devices herein described and provide attached means to prevent end movement, and I wish to include such built-up boxes as within the terms of my claims. The chief benefit in building-up the boxes would be in regard to the matter of weight.

In Fig. 3 I show a box wherein the shaft passes right through the appliance and in that case two packings 14 and two springs 18 or equivalent devices are fitted together with adjusting means.

I declare that what I claim is.

1. A bearing box provided with a well adjacent to one wall thereof and with a bearing opening in said wall adapted to receive a shaft, another wall of the box having an access opening therein communicating directly with the well, a split packing member mounted within the box in engagement with the first-named wall of the box at the bearing opening and being adapted to be withdrawn freely through the access opening without disturbing the shaft, and resilient means bearing against the packing member for pressing the same against the said wall.

2. A bearing box provided with a well adjacent to one wall thereof and with a bearing opening in said wall adapted to receive a shaft, another wall of the box having an access opening therein communicating directly with the well, a split packing member mounted within the box in engagement with the first-named wall of the box at the bearing opening and being adapted to be withdrawn freely through the access opening without disturbing the shaft, a washer ring mounted within the box in engagement with the innermost face of the packing member and in registration with the bearing opening, and a spring tongue fixed at one end to the box and having its free end engaging the inner side of the ring.

3. A bearing box provided with a well adjacent to one wall thereof and with a bearing opening in said wall adapted to receive a shaft, another wall of the box having an access opening therein communicating directly with the well, a split packing member mounted within the box in engagement with the first-named wall of the box at the bearing opening and being adapted to be withdrawn freely through the access opening without disturbing the shaft, a washer ring mounted within the box in engagement with the innermost face of the packing member and in registration with the bearing opening, and a spring tongue fixed at one end to the box and having its free end engaging the inner side of the ring, and a tensioning screw adjustably mounted within the box and extending through the spring tongue with its head engaging the same.

4. A bearing box provided with a well adjacent to one wall thereof and with a bearing opening in said wall adapted to receive a shaft, another wall of the box having an access opening therein communicating directly with the well, a split packing member mounted within the box in engagement with the first-named wall of the box at the bearing opening and being adapted to be withdrawn freely through the access opening without disturbing the shaft, a washer ring mounted within the box in engagement with the innermost face of the packing member and in registration with the bearing opening, and a spring tongue fixed at one end to the box and having its free end engaging the inner side of the ring, the free end of the said tongue being inbent toward the washer ring, and parallel lugs provided upon the adjacent face of the ring to embrace the said inbent end of the tongue.

In testimony whereof I have signed my name to this specification in the presence of two subscribing witnesses.

WILLIAM PARSONAGE EVANS.

Witnesses:
　RICHARD WEBSTER IBBERSON,
　NORMAN KIERNAN.

Copies of this patent may be obtained for five cents each, by addressing the "Commissioner of Patents, Washington, D. C."